United States Patent
Vahldiek-Oberwagner et al.

(10) Patent No.: US 12,113,902 B2
(45) Date of Patent: Oct. 8, 2024

(54) SCALABLE ATTESTATION FOR TRUSTED EXECUTION ENVIRONMENTS

(71) Applicant: Intel Corporation, Santa Clara, CA (US)

(72) Inventors: Anjo Lucas Vahldiek-Oberwagner, Portland, OR (US); Ravi L. Sahita, Portland, OR (US); Mona Vij, Hillsboro, OR (US); Dayeol Lee, Irvine, CA (US); Haidong Xia, Folsom, CA (US); Rameshkumar Illikkal, Folsom, CA (US); Samuel Ortiz, Montpellier (FR); Kshitij Arun Doshi, Tempe, AZ (US); Mourad Cherfaoui, Saratoga, CA (US); Andrzej Kuriata, Gdansk (PL); Teck Joo Goh, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 17/131,684

(22) Filed: Dec. 22, 2020

(65) Prior Publication Data
US 2021/0111892 A1     Apr. 15, 2021

(51) Int. Cl.
*G06F 21/53*    (2013.01)
*G06F 21/57*    (2013.01)
(Continued)

(52) U.S. Cl.
CPC ............ *H04L 9/321* (2013.01); *H04L 9/3242* (2013.01)

(58) Field of Classification Search
CPC ..... H04L 9/321; H04L 9/3242; H04L 9/3247; H04L 9/0897; H04L 63/08; G06F 21/53; G06F 21/57; G06F 21/602; G06F 21/72
See application file for complete search history.

(56) References Cited

U.S. PATENT DOCUMENTS

| 2007/0079120 A1* | 4/2007 | Bade ...................... G06F 21/57 713/166 |
| 2017/0085540 A1* | 3/2017 | Avanzi ................. H04L 9/0877 |
| 2020/0127850 A1* | 4/2020 | Scarlata ............... H04L 9/3242 |

FOREIGN PATENT DOCUMENTS

| WO | 2019084908 | 5/2019 | |
| WO | WO-2019084908 A1 * | 5/2019 | ............. G06F 21/57 |

(Continued)

OTHER PUBLICATIONS

Anati, Ittai, Shay Gueron, Simon Johnson and Vincent Scarlata. "Innovative Technology for CPU Based Attestation and Sealing." (2013). (Year: 2013).*

(Continued)

*Primary Examiner* — Joseph P Hirl
*Assistant Examiner* — Aayush Aryal
(74) *Attorney, Agent, or Firm* — Schwegman Lundberg & Woessner, P.A.

(57) ABSTRACT

In function-as-a-service (FaaS) environments, a client makes use of a function executing within a trusted execution environment (TEE) on a FaaS server. Multiple tenants of the FaaS platform may provide functions to be executed by the FaaS platform via a gateway. Each tenant may provide code and data for any number of functions to be executed within any number of TEEs on the FaaS platform and accessed via the gateway. Additionally, each tenant may provide code and data for a single surrogate attester TEE. The client devices of the tenant use the surrogate attester TEE to attest each of the other TEEs of the tenant and establish trust with the functions in those TEEs. Once the functions have been attested, the client devices have confidence that the other TEEs of the tenant are running on the same platform as the gateway.

25 Claims, 11 Drawing Sheets

(51) Int. Cl.
    *G06F 21/60*     (2013.01)
    *G06F 21/72*     (2013.01)
    *H04L 9/08*     (2006.01)
    *H04L 9/32*     (2006.01)
    *H04L 9/40*     (2022.01)

(56) References Cited

FOREIGN PATENT DOCUMENTS

WO     2020177879     9/2020
WO     WO-2022028057 A1 *     2/2022     ........... G06F 13/382

OTHER PUBLICATIONS

Anati, Ittai, Shay Gueron, Simon Johnson and Bincent Scarlata. "Innovative Technology for CPU Based Attestation and Sealing." (Year: 2013).*

"European Application Serial No. 21208882.7, Extended European Search Report mailed May 6, 2022", 6 pgs.

"Intel Software Guard Extensions (Intel SGX)", Intel(R) Software Guard Extensions Developer Guidehttps: software.intel.com content www us en develop download intel-software-guard-extensions-intel-sgx-developer-guide.html, (May 29, 2018), 52 pgs.

Areno, Matthew, "Securing Trusted Execution Environments with PUF Generated Secret Keys", 2012 IEEE 11th International Conference on Trust, Security and Privacy in Computing and Communications, (Jun. 2012), 5 pgs.

Ittai, Anati, "Innovative Technology for CPU Based Attestation and SE Aling", software.intel.com, [Online]. Retrieved from the Internet: https: software.intel.com en-us articles innovative-technology-for-cpu -based-attestation-and-sealing, (Aug. 14, 2013), 1-7.

Sardar, Muhammad Usama, "Towards Formalization of Enhanced Privacy ID (EPID)-based Remote Attestation in Intel SGX", Formal Analysis of Attestation in Trusted Execution Environments, (Apr. 2020), 4 pgs.

"European Application Serial No. 21208882.7, Response filed Nov. 22, 2022 to Extended European Search Report mailed May 6, 2022", 9 pgs.

* cited by examiner

| 510 | ATTESTATION TABLE | |
|---|---|---|
| 520 | ENCLAVE ID | STATUS |
| 530A | 0 | ATTESTED |
| 530B | 1 | UNATTESTED |
| 530C | 2 | NOT OWNED |

| 540 | REMOTE FUNCTION TABLE | | |
|---|---|---|---|
| 550 | FUNCTION | SERVER | STATUS |
| 560A | DSP | 10.0.0.1 | ATTESTED |
| 560B | FOLD | 10.0.0.1 | UNATTESTED |
| 560C | ENCRYPT | 10.0.0.2 | UNATTESTED |

*FIG. 5*

SCALABLE ATTESTATION FOR TRUSTED EXECUTION ENVIRONMENTS

TECHNICAL FIELD

The subject matter disclosed herein generally relates to hardware trusted execution environments (TEEs). Specifically, the present disclosure addresses systems and methods for scalable attestation and orchestration for functions in TEEs.

BACKGROUND

Hardware privilege levels may be used by a processor to limit memory access by applications running on a device. An operating system runs at a higher privilege level and can access all memory of the device and define memory ranges for other applications. The applications, running a lower privilege level, are restricted to accessing memory within the range defined by the operating system and are not able to access the memory of other applications or the operating system. However, an application has no protection from a malicious or compromised operating system.

An enclave is enabled by processor protections that guarantee that code and data loaded inside the enclave is protected from access by code executing outside of the enclave. Thus, the enclave provides an isolated execution environment that prevents, at the hardware level, access of the data and code contained in the enclave from malicious software, including the operating system.

BRIEF DESCRIPTION OF THE DRAWINGS

Some embodiments are illustrated by way of example and not limitation in the figures of the accompanying drawings.

FIG. 5 is a block diagram of a database schema, according to some example embodiments, suitable for use in scalable attestation for TEEs.

DETAILED DESCRIPTION

Figure 1:
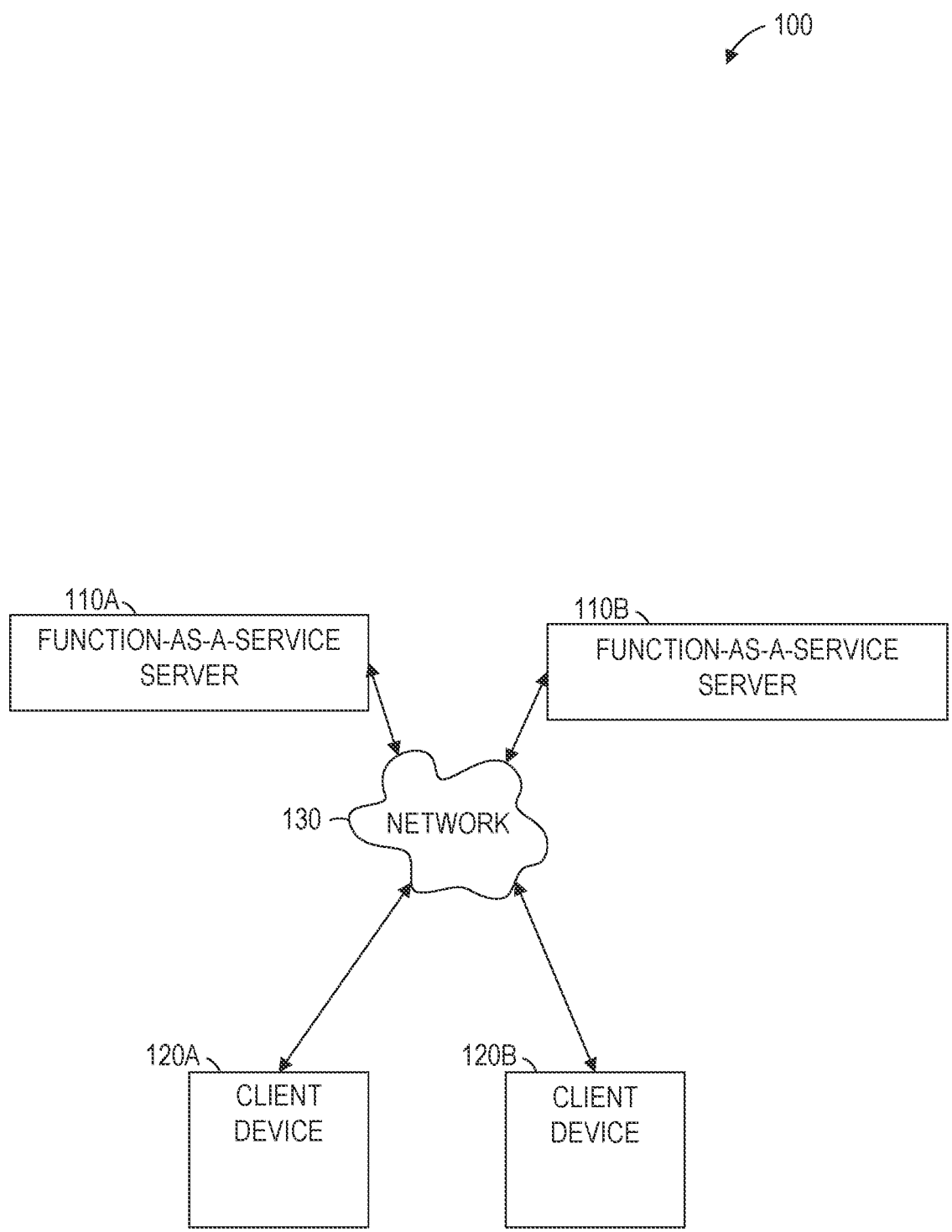
FIG. 1 is a network diagram illustrating a network environment suitable for servers providing functions as a service using TEEs, according to some example embodiments.

Example methods and systems are directed to scalable attestation for TEEs. In the most general sense, a TEE is any trusted execution environment, regardless of how that trust is obtained. An enclave is a portion of memory protected from access by processes outside of the enclave, even if those processes are running at an elevated privilege level. By way of example, TEEs are discussed as being provided by executing code within enclaves. However, other types of TEEs may be used.

TEEs may be used to enable the secure handling of confidential information by protecting the confidential information from all software outside of the TEE. TEEs may also be used for modular programming, wherein each module contains everything necessary for its own functionality without being exposed to vulnerabilities caused by other modules. For example, a code injection attack that is successful against one TEE cannot impact the code of another TEE.

Total memory encryption (TME) protects data in memory from being accessed by bypassing a processor. The system generates an encryption key within the processor on boot and never stores the key outside of the processor. The TME encryption key is an ephemeral key because it does not persist across reboots and is never stored outside of the processor. All data written by the processor to memory is encrypted using the encryption key and decrypted when it read back from memory. Thus, a hardware-based attack that attempts to read data directly from memory without processor intermediation will fail.

Multi-key TME (MKTME) extends TME to make use of multiple keys. Individual memory pages may be encrypted using the ephemeral key of TME or using software-provided keys. This may provide increased security over TME with respect to software-based attacks, since an attacker will need to identify the particular key being used by targeted software rather than having the processor automatically decrypt any memory that the attack software has gained access to.

In function-as-a-service (FaaS) environments, a client makes use of a function executing within a TEE on a FaaS server. FaaS platforms provide cloud computing services that execute application logic but do not store data. Before providing confidential data to the function, the client verifies that the function is executing with a TEE and thus that the confidential data cannot be accessed by other functions that are not part of the trusted environment.

Several full or partial solutions for attestation exist. For example, a public key may be embedded in a code block provided to the FaaS server for execution in a TEE. The client device can encrypt data before sending it to a function in the code block. Thus, the client device is ensured that only code with access to the public key can access the encrypted data. However, the function may still be executing in a non-secured environment. Additionally, an attacker could extract the public key from the code block and use it in malicious code that spoofs the intended function.

When an enclave is created, it may be "measured." In this context, measurement refers to a set of data that is sufficient to uniquely identify the attributes and contents of an enclave. Thus, two enclaves will have the same measurements only if they include the same code and data, use the same amount of memory, have equal security levels, and so on. The measuring of an enclave is performed by a hardware processor and stored in protected registers or memory. The measurements may be signed by a processor using an Elliptic-Curve-Digital-Signature-Algorithm (ECDSA)-based asymmetric-attestation key. Another processor, having the corresponding decryption key built in, can verify the signature. The signed data may include a timestamp and an identifier of the signer. Thus, the recipient can confirm that the signed data is current and originated at the FaaS server.

Using this attestation mechanism, a client is able to attest that a function that is being directly accessed from the client is actually running in a TEE. However, it may be beneficial for the FaaS server to provide a gateway interface to multiple functions. For example, a representational state transfer (REST) application programming interface (API) allows clients to make function calls using hypertext transport protocol (HTTP). In these implementations, a gateway application receives all of the REST API function calls, translates the uniform resource locator (URL) to a function identifier and function parameters, calls the function with the function parameters, receives a result, and provides the result over the network. The gateway may run in a TEE, in which case the client device can attest the gateway. However, the measurements of the gateway do not allow the client device to attest that the underlying functions are also running in TEEs.

Multiple tenants of the FaaS platform may provide functions to be executed by the FaaS platform via the gateway. A tenant is a group of users that share common access to data, such as users with accounts linked to a particular company. Protection of data between tenants may be a goal of the tenants and the FaaS platform. The FaaS platform comprises one or more FaaS servers, in one or more datacenters. Thus, the gateway may include a load-balancer or other functionality for distributed computing. Since the FaaS platform is providing functionality for multiple tenants via the gateway, no one tenant can control the gateway.

As discussed herein, each tenant may provide code and data for any number of functions to be executed within any number of TEEs on the FaaS platform and accessed via the gateway. Additionally, each tenant may provide code and data for a single surrogate attester TEE. The client devices of the tenant use the surrogate attester TEE to attest each of the other TEEs of the tenant and establish trust with the functions in those TEEs. Once the functions have been attested, the client devices have confidence that the other TEEs of the tenant are running on the same platform as the gateway (which may also be attested).

Since the tenant controls the contents of the surrogate attester TEE, the surrogate attester TEE may be designed to securely attest each of the deployed TEEs of the tenant, which the gateway is unable to do. Since only a single surrogate attester TEE is needed for each tenant, this solution is scalable, allowing any number of TEEs to be created for each tenant without increasing the attestation overhead.

By comparison with existing methods of attesting enclaves of a tenant, the methods and systems discussed herein enable the use of a gateway to access the enclaves without requiring direct attestation over a network of each enclave, thus reducing network usage. Since the overhead of a single surrogate attester TEE does not increase when the tenant functions are protected in finer-grained enclaves, system security is increased. When these effects are considered in aggregate, one or more of the methodologies described herein may obviate a need for certain efforts or resources that otherwise would be involved in attesting enclaves. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for servers providing functions as a service using TEEs, according to some example embodiments. The network environment 100 includes a FaaS servers 110A and 110B, client devices 120A and 120B, and a network 130. The FaaS servers 110A-110B provide functions to client devices 120A-120B via the network 130. The FaaS servers 110A and 110B may be referred to collectively as FaaS servers 110 or generically as a FaaS server 110. The client devices 120A and 120B may be referred to collectively as client devices 120 or generically as a client device 120.

The client devices 120A and 120B may be devices of different tenants, such that each tenant wants to ensure that their tenant-specific data and code is not accessible by other tenants. Accordingly, the FaaS servers 110A-110B may use an enclave for each FaaS provided. The FaaS servers 110A-110B and the client devices 120A and 120B may each be implemented in a computer system, in whole or in part, as described below with respect to FIG. 9.

Systems and methods described herein to scalably provide attestation of TEEs may be used. For example, an attestation surrogate enclave for each tenant may be created by a FaaS server 110 to allow for attestation by the client devices 120 of the functions provided before accessing the functions through a gateway.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The FaaS servers 110 and the client devices 120 are connected by the network 130. The network 130 may be any network that enables communication between or among machines, databases, and devices. Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Each of the devices is connected to the network 130 using a network interface.

Figure 2:
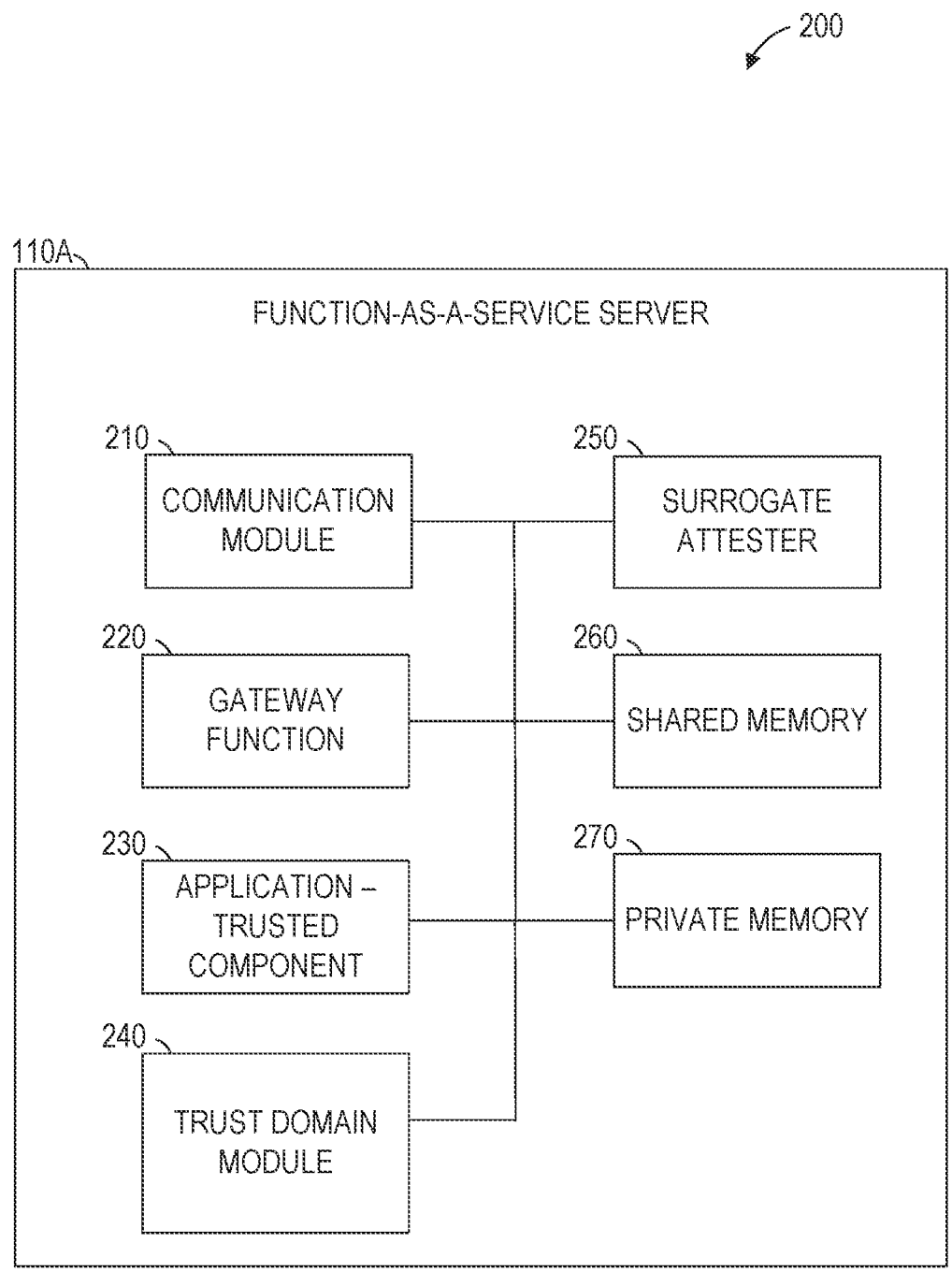
FIG. 2 is a block diagram of a function-as-a-service server, according to some example embodiments, suitable for scalable attestation for TEEs.

FIG. 2 is a block diagram 200 of the FaaS server 110A, according to some example embodiments, suitable for scalable attestation for TEEs. The FaaS server 110A is shown as including a communication module 210, a gateway function 220, a trusted component 230 of an application, a trusted domain module 240, a surrogate attester 250, a shared memory 260, and a private memory 270, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the FaaS server 110A and transmits data from the FaaS server 110A. For example, the communication module 210 may receive, from the client device 130A, a request to perform a function. After the function is performed, the results of the function are provided by the communication module 210 to the client device 130A. Communications sent and received by the communication module 210 may be intermediated by the network 130. The called function may be intermediated by another function. For example, the communication module 210 may provide a URL to the gateway function 220. The gateway function 220 parses the URL and invokes a function in the trusted component 230.

The gateway function 220 may execute within or outside of an enclave. If the gateway function does not operate within an enclave, if the operating system or other untrusted components are compromised, the gateway function 220 is vulnerable to attack. The trusted component 230 executes within an enclave. Thus, even if the operating system or the untrusted component 220 is compromised, the data and code of the trusted component 230 remains secure.

The trusted domain module 240 creates and protects enclaves and is responsible for transitioning execution between the gateway function 220 and the trusted component 230. Signed code may be provided to the trusted domain module 240, which verifies that the code has not been modified since it was signed. The signed code is loaded into a portion of physical memory that is marked as being part of an enclave. Thereafter, hardware protections prevent access, modification, execution, or any suitable combination thereof of the enclave memory by untrusted software. The code may be encrypted using a key only available to the trusted domain module 240.

Once the trusted component 230 is initialized, the gateway function 220 can invoke functions of the trusted component 230 using special processor instructions of the trusted domain module 240 that transition from an entrusted mode to a trusted mode or between trusted enclaves. The trusted component 230 performs parameter verification, performs the requested function if the parameters are valid, and returns control to the gateway function 220 via the trusted domain module 240. Multiple trusted components 230 may be instantiated in the FaaS server 110A, each providing one or more functions.

The trusted domain module 240 may be implemented as one or more components of an Intel® hardware processor providing Intel® Software Guard Extensions (SGX), Intel® Trust Domain Extensions (TDX), or both. In Intel® SGX, attestation is the mechanism by which a third entity establishes that a software entity is running on an Intel® SGX enabled platform protected within an enclave prior to provisioning that software with secrets and protected data. Attestation relies on the ability of a platform to produce a credential that accurately reflects the signature of an enclave, which includes information on the enclave's security properties. The Intel® SGX architecture provides the mechanisms to support two forms of attestation. There is a mechanism for creating a basic assertion between enclaves running on the same platform, which supports local, or intra-platform attestation, and then another mechanism that provides the foundation for attestation between an enclave and a remote third party.

The surrogate attester 250 generates attestation for enclaves (e.g., the trusted component 230). The attestation is an evidence structure that uniquely identifies the attested enclave and the host (e.g., the FaaS server 110A), using asymmetric encryption and supported by built-in processor functions. The attestation may be provided to a client device 120 via the communication module 210, allowing the client device 120 to confirm that the trusted component 230 has not been compromised. For example, the processor may be manufactured with a built-in private key using hardware that prevents access of the key. Using this private key, the attestation structure can be signed by the processor to generate a signed structure. Using a corresponding public key published by the hardware manufacturer, the signature can be confirmed by the client device 120. This allows the client device 120 to ensure that the enclave on the remote device (e.g., the FaaS server 110A) has actually been created without being tampered with.

Both the gateway function 220 and the trusted component 230 can access and modify the shared memory 260, but only the trusted component 230 can access and modify the private memory 270. Though only one trusted component 230 and one private memory 270 are shown in FIG. 2, each tenant may have multiple trusted components 230, each with a corresponding private memory 270. Additionally, multiple applications may be run with separate memory spaces, and thus separate shared memories 260. In this context "shared" refers to the memory being accessible by all software and hardware with access to the memory space (e.g., an application and its operating system), not necessarily being accessible by all applications running on the system.

The surrogate attester 250 for a tenant may verify the integrity of one or more trusted components 230 for the tenant. Thus, by communication with a single surrogate attester 250, the client devices 120 of the tenant are able to verify any number of trusted components 230 prior to invoking functions of those components using the single gateway function 220.

Mutual attestation between enclaves (e.g., between the surrogate attester 250 and each of the one or more trusted components 230 for the same tenant or between two of the trusted components 230) may be enabled by having each enclave maintain a list of measurement hashes (e.g., MRENCLAVE values provided by Intel® SGX) of the enclaves that it attests. The measurement values may be maintained in a manifest and the hash value of the manifest can be loaded at enclave creation, thereby securing the measurement hashes that the enclave will trust. Thus, after requesting the measurement hash for another enclave from the secure processor (e.g., using Intel® SGX or TDX), the requested hash can be compared with the stored hash to confirm that the other enclave is one of the trusted enclaves without using a third-party attestation verifier. Thus, so long as the surrogate attester 250 is trusted by the tenant and the surrogate attester 250 is able to attest to the other enclaves running on the FaaS server, the tenant is able to attest that all of the enclaves are secure.

Figure 3:
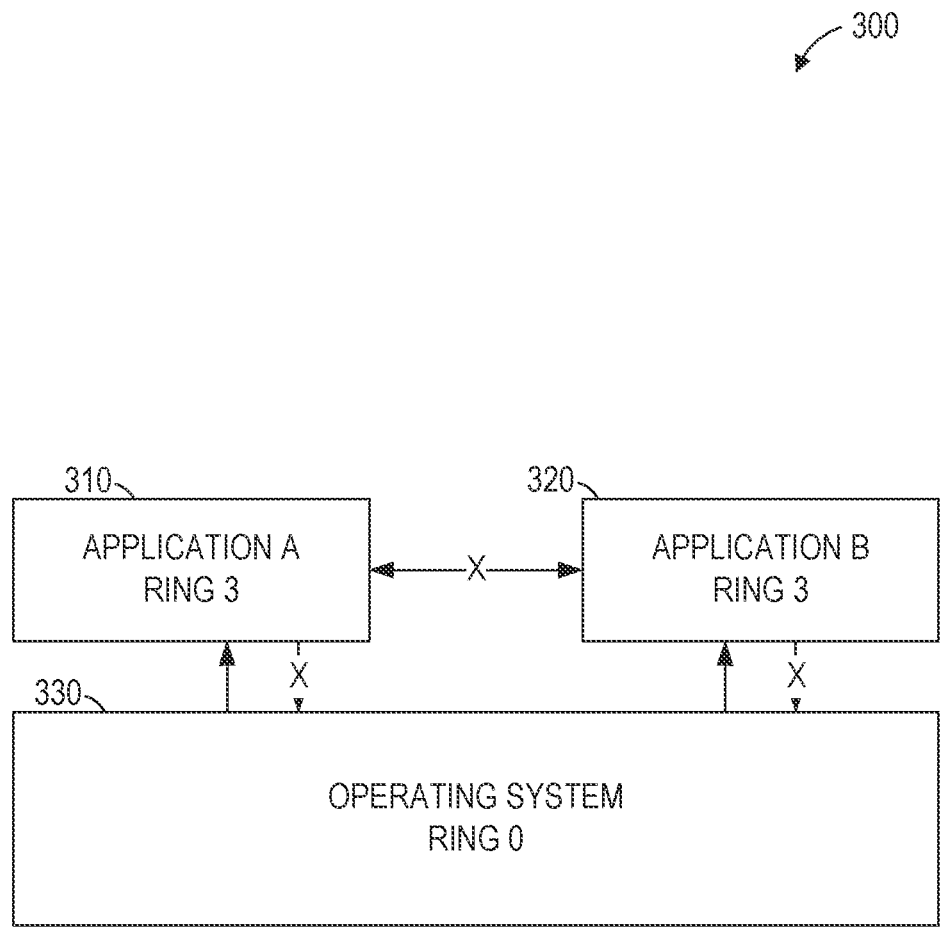
FIG. 3 is a block diagram of prior art ring-based memory protection.

FIG. 3 is a block diagram 300 of prior art ring-based memory protection. The block diagram 300 includes applications 310 and 320 and an operating system 330. The operating system 330 executes processor commands in ring 0 (Intel® and AMD® processors), exception level 1 (ARM® processors), or an equivalent privilege level. The applications 310-320 execute processor commands in ring 3 (Intel® and AMD® processors), exception level 0 (ARM® processors), or an equivalent privilege level.

The hardware processor prevents code that is executing at the lower privilege level from accessing memory outside of the memory range defined by the operating system. Thus, the code of the application 310 cannot directly access the memory of the operating system 330 or the application 320 (as shown by the "X" in FIG. 3). The operating system 330 exposes some functionality to the applications 310-320 by predefining specific access points (e.g., by call gates, SYSENTER/SYSEXIT instructions on Intel® processors, SYSCALL/SYSRET instructions on AMD® processors, or any suitable combination or equivalent thereof).

Since the operating system 330 has access to all of memory, the applications 310 and 320 have no protection from a malicious operating system. For example, a competitor may modify the operating system before running the application 310 in order to gain access to the code and data of the application 310, permitting reverse engineering.

Additionally, if an application is able to exploit a vulnerability in the operating system 330 and promote itself to the privilege level of the operating system, the application would be able to access all of memory. For example, the application 310, which is not normally able to access the memory of the application 320 (as shown by the X between the applications 310 and 320 in FIG. 3), would be able to access the memory of the application 320 after promoting itself to ring 0 or exception level 1. Thus, if the user is tricked into running a malicious program (e.g., the application 310), private data of the user or an application provider may be accessed directly from memory (e.g., a banking password used by the application 320).

Figure 4:
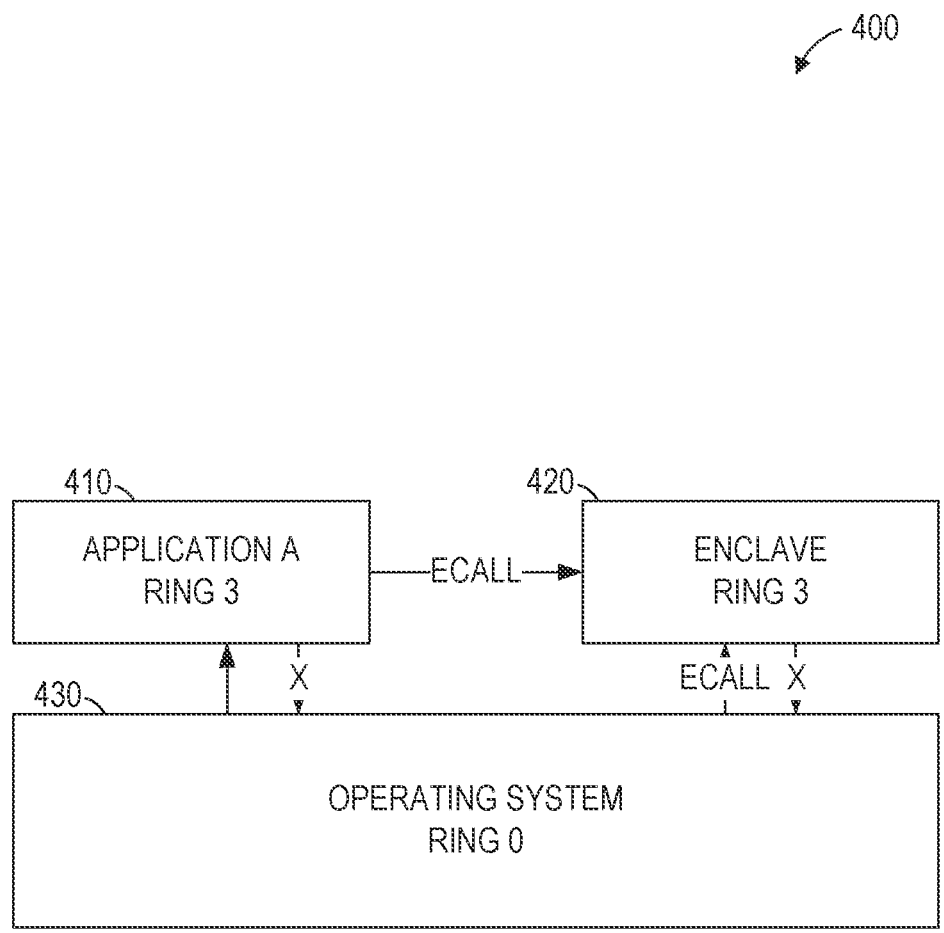
FIG. 4 is a block diagram of enclave-based memory protection, suitable for reducing latency of TEEs according to some example embodiments.

FIG. 4 is a block diagram 400 of enclave-based memory protection, suitable for reducing latency of TEEs according to some example embodiments. The block diagram 400 includes an application 410, an enclave 420, and an operating system 430. The operating system 430 executes processor commands in ring 0 (Intel® and AMD® processors), exception level 1 (ARM® processors), or an equivalent privilege level. The application 410 and the enclave 420 execute processor commands in ring 3 (Intel® and AMD® processors), exception level 0 (ARM® processors), or an equivalent privilege level.

The operating system 430 allocates the memory of the enclave 420 and indicates to the processor the code and data to be loaded into the enclave 420. However, once instantiated, the operating system 430 does not have access to the memory of the enclave 420. Thus, even if the operating system 430 is malicious or compromised, the code and data of the enclave 420 remains secure.

The enclave 420 may provide functionality to the application 410. The operating system 430 may control whether the application 410 is permitted to invoke functions of the enclave 420 (e.g., by using an ECALL instruction). Thus, a malicious application may be able to gain the ability to invoke functions of the enclave 420 by compromising the operating system 430. Nonetheless, the hardware processor will prevent the malicious application from directly accessing the memory or code of the enclave 420. Thus, while the code in the enclave 420 cannot assume that functions are being invoked correctly or by a non-attacker, the code in the enclave 420 has full control over parameter checking and other internal security measures and is only subject to its internal security vulnerabilities.

FIG. 5 is a block diagram of a database schema 500, according to some example embodiments, suitable for use in scalable attestation for TEEs. The database schema 500 includes an attestation table 510 and a remote function table 540. The attestation table 510 includes rows 530A, 530B, and 530C of a format 520. The attestation table 510 may be used by the surrogate attester 250, the client devices 120A-120B, or any suitable combination thereof. The remote function table 540 includes rows 560A, 560B, and 560C of a format 550. The remote function table 540 may be used by the client devices 120A-120B.

The format 520 of the attestation table 510 includes an enclave identifier field and a status field. Each of the rows 530A-530C stores data for a single enclave. The enclave identifier is a unique identifier for the enclave. For example, when an enclave is created, the trusted domain module 240 may assign the next unused identifier to the created enclave. The status field indicates the status of the enclave, such as attested, unattested, or not owned by the attesting tenant.

Thus, in the example of FIG. 5, three enclaves are shown in the attestation table 510. One of the enclaves is attested, one is unattested, and one is not owned. Accordingly, if the attestation table 510 is integrated in the surrogate attester 250, a request for status from the client device 120A may be responded to with an indication that only enclave 0 has been attested. As a result, the client device 120A may authorize calls to the FaaS server 110A only for the function associated with enclave 0. Alternatively, the surrogate attester 250 may respond to the request by attempting to attest the unattested enclaves (e.g., enclave 1 of the row 530B) before providing results to the client device 120A.

In embodiments in which the attestation table 510 is stored on the client devices 120, applications executing on each client device 120 may check the status field of the enclave corresponding to a function before invoking the function using the FaaS server 110A. Accordingly, unattested functions will not be invoked, and the tenant data will not be exposed to the function. Lazy attestation may be performed, such that a TEE for a function is only attested in response to a request, on the client device, for an attestation.

Alternatively or additionally, each client device 120 may use the remote function table 540. The format 550 of the remote function table 540 includes a function name, a server identifier, and a status field. Each of the rows 560A-560C stores data for a single function. The function name is a unique identifier for the function. The server identifier identifies the server that performs the function. In the example of FIG. 5, the server 10.0.0.1 performs the DSP and FOLD functions and the server 10.0.0.2 performs the ENCRYPT function. In the example of FIG. 5, the server identifiers are Internet Protocol (IP) addresses, but other identifiers may be used. The status field indicates the status of the enclave containing the function, such as attested or unattested.

Figure 6:
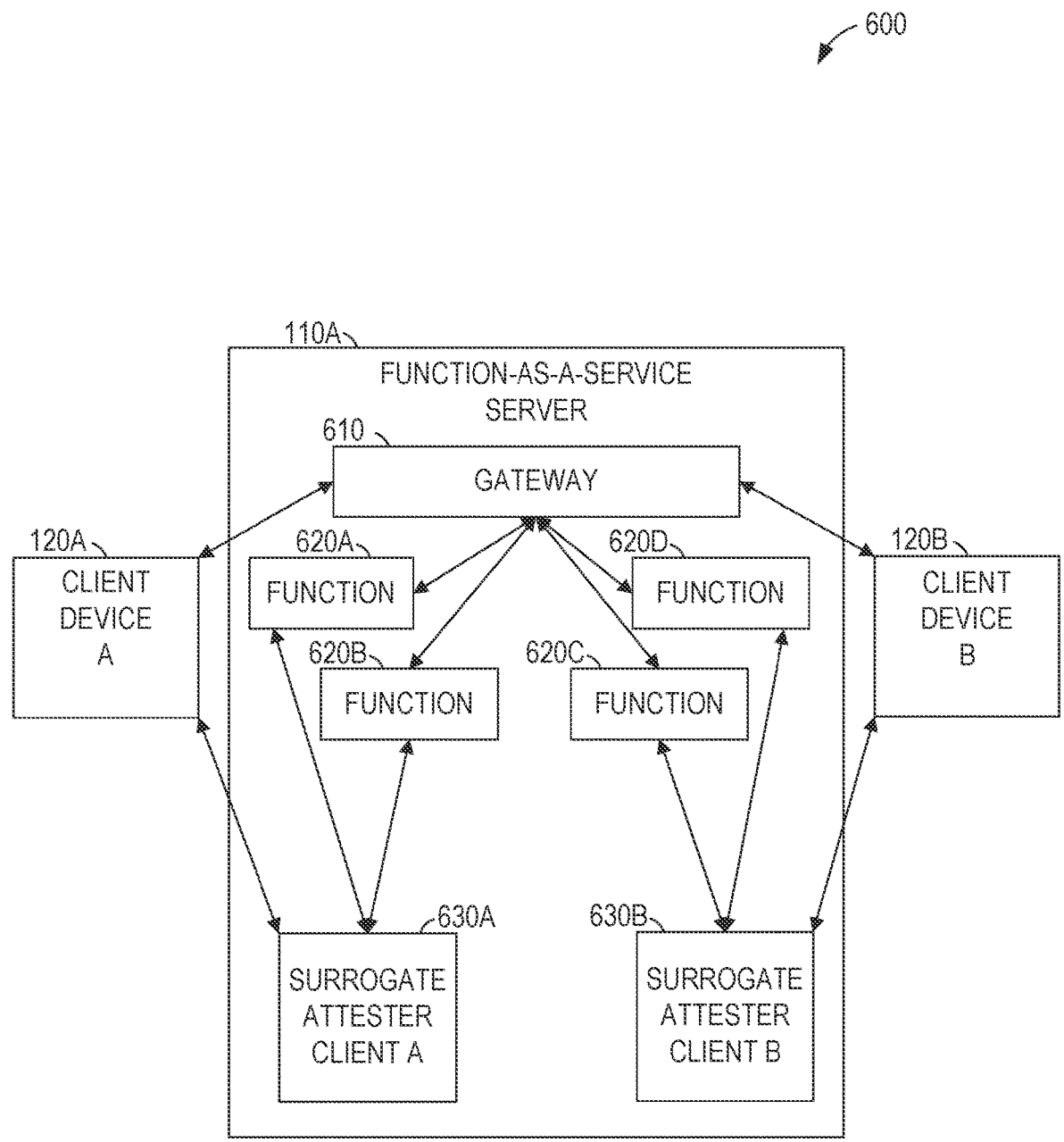
FIG. 6 is a block diagram of communication links between functions and devices suitable for use in scalable attestation for TEEs, according to some example embodiments.

FIG. 6 is a block diagram 600 of communication links between functions and devices suitable for use in scalable attestation for TEEs, according to some example embodiments. As shown in FIG. 6, the FaaS 110A provides a gateway 610, functions 620A, 620B, 620C, and 620D, and surrogate attester clients 630A and 630B. With reference to FIG. 2, the gateway 610 corresponds to the gateway function 220, the functions 620A-620D correspond to four trusted components 230, and the surrogate attester clients 630A-630D correspond to two surrogate attesters 250.

The client devices 120A and 120B, of two different tenants, contact the FaaS 110A via two interfaces, the gateway 610 and the surrogate attester client 630A or 630B corresponding to the tenant. The FaaS server 110A provides functions 620A, 620B, 620C, and 620D, each in a separate TEE. In this example, the surrogate attester client 630A attests the TEEs for the functions 620A and 620B, containing code provided by the tenant associated with the client device 120A for execution on the FaaS server 110A. Likewise, the surrogate attester client 630B attests the TEEs for the functions 620C and 620D, containing code provided by the tenant associated with the client device 120B for execution on the FaaS server 110A. The surrogate attester client 630A is unable to attest the TEEs for the functions 620C and 620D because the surrogate attester client 630A was not provided by the same tenant that provided the code for the functions 620C and 620D. Since they were provided by different tenants, the secret security information used by the functions 620C-620D is not available to the surrogate attester client 630A. Thus, the addition of the surrogate attester clients 630A-630B does not compromise the inter-tenant security provided by the use of TEEs.

After using the surrogate attester client 630A to attest the functions 620A and 620B, the client device 120A uses the gateway 610 to invoke one of the functions 620A or 620B, with confidence that the correct function is being invoked in a secure environment. This process may be repeated for any number of clients of any number of tenants, with each tenant having any number of protected functions 620A-620D, but only using one surrogate attester client 630A-630B for each tenant. As a result, the scalability of the FaaS server 110A is improved over systems that provide for remote attestation of each TEE without a surrogate attester client and the security of the FaaS server 110A is improved over systems that do not allow for remote attestation of each TEE.

Figure 7:
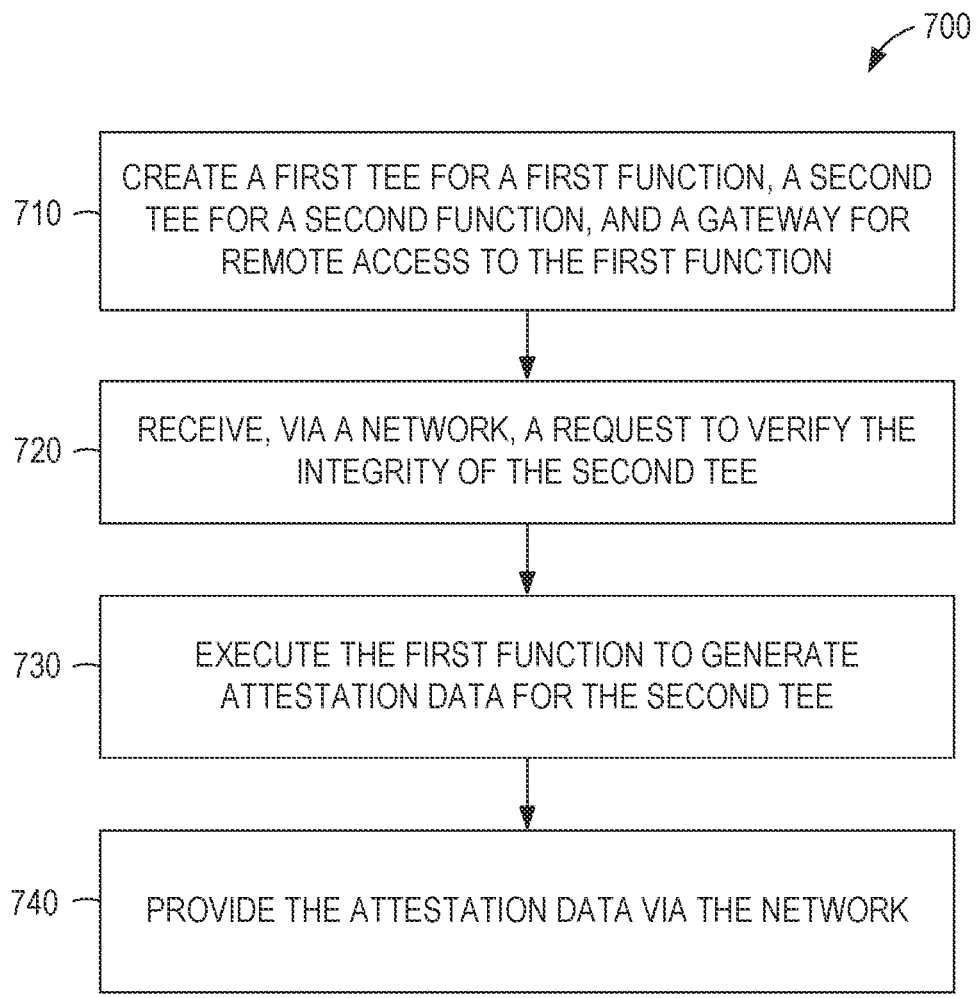
FIG. 7 is a flowchart illustrating operations of a method suitable for execution by a server in providing scalable attestation for TEEs, according to some example embodiments.

FIG. 7 is a flowchart illustrating operations of a method 700 suitable for execution by a server in providing scalable attestation for TEEs, according to some example embodiments. The method 700 includes operations 710, 720, 730, and 740. By way of example and not limitation, the method 700 may be performed by the FaaS server 110A of FIG. 1, using the modules, databases, and structures shown in FIGS. 2-4.

In operation 710, the trusted domain module 240 creates a first TEE for a first function, a second TEE for a second function, and a gateway for remote access to the first function. With reference to FIG. 6, the first function may be the function 620A, the second function may be the surrogate attester client 630A, and the gateway may be the gateway 610. In some example embodiments, the surrogate attester client 630A is verified by the client device 120A by requesting and verifying attestation data of the surrogate attester client 630A itself. Once attestation of the attester client 630A is complete, the client device 120A may provide an encryption key to be used by the surrogate attester client 630A for further communication with the client device 120A.

In some example embodiments, the gateway 610 is verified by the client device 120A by requesting and verifying attestation data of the gateway 610 itself. In other example embodiments, the gateway 610 is not verified by the client device 120A.

Creating a TEE may include processing a request that includes a pre-computed hash value for the TEE and indicates a portion of the shared memory 260 (e.g., a portion identified by an address and a size included in the request) that contains the code and data for the TEE. The trusted domain module 240 may perform a hash function on a binary memory state (e.g., the portion of the shared memory 260 indicated in the request) to confirm that the hash value provided in the request matches the computed hash value. If the hash values match, the trusted domain module 240 has confirmed that the indicated memory actually contains the code and data of the requested TEE. If the hash values don't match, the trusted domain module 240 may return an error value, preventing the modified memory from being loaded into the enclave.

The FaaS server 110A receives a request via the network 130 to verify the integrity of the second TEE (operation 720). For example, a remote function call to the first function may be made. As a further example, the surrogate attester client 630A may be invoked to verify the integrity of the TEE containing the function 620A.

In operation 730, the FaaS server 110A executes the first function to generate attestation data for the second TEE. For example, measurements of the second TEE may be accessed by the first function and signed using a key exchanged between the first function and the client device 120A prior to the receiving of the first function call in operation 720.

The data and code for a TEE may include a self-signed certificate from the author of the TEE. This self-signed certificate allows the trusted domain module 240 to verify that the data and code being loaded into the TEE have not been modified since they were signed. The signed data includes an identifier of the author. Thus, the attestation data for the second TEE indicates both that the TEE was unmodified after signing and the identifier of the author. If the author is the tenant associated with the client device 120A, the validity of the TEE is confirmed. For further protection, the attestation data for the second TEE may be generated within the second TEE and exported to the first function. The attestation data may be a structure that includes an identity of the second TEE, one or more attributes of the second TEE, a message authentication code (MAC), or any suitable combination thereof. The structure may be signed using an ephemeral private key.

The memory space of a TEE may be encrypted using Xor-encrypt-xor (XEX)-based tweaked-codebook mode with ciphertext stealing (XTS) mode of the Advanced Encryption Standard (AES) with ephemeral 128-bit memory encryption keys. Additionally, cryptographic integrity protection may be provided using a Secure Flash Algorithm 3 (SHA-3) based MAC. A MAC is a piece of information used to identify a message. The MAC protects the message's data integrity by allowing verifies to detect any changes to the message content.

The first function, in operation 740, provides the attestation data via the network. Continuing with this example, the client device 120A receives the signed attestation data, verifies that the data was signed by the already-attested surrogate attester client 630A, and verifies that the attestation data correctly identifies the second TEE.

Alternatively, the first function may verify the signed structure and provide to the client device an indication as to whether the attestation succeeded or failed rather than provide the attestation data itself. Verifying the attestation data may include verifying the signature of the attestation data using an ephemeral public key corresponding to the ephemeral private key used for the signing.

Once verification of the second TEE is complete, the client device 120A can safely invoke the second function of the second TEE via the gateway. Invocation of the second function of the second TEE may include providing parameters to the second function, generating a return value, and providing the return value to the client device 120A via the network 130.

In some example embodiments, the second function requests access to data of the first TEE. For example, the client device 120A may provide configuration data to the first TEE via the direct connection shown in FIG. 6 and the function 620A may access that data, reducing the number of parameters that are communicated via the gateway 610. The first TEE may determine whether the second TEE has been verified and share the requested data only if the second TEE has been verified. This ensures that the tenant's data is not shared with unverified functions.

The data may be passed between TEEs by encrypting the data of one TEE using an ephemeral key and providing the encrypted data and access to the ephemeral key to another TEE. Hardware protections may prevent the ephemeral key from being used from unprotected memory (e.g., code running outside of any TEE).

Figure 8:
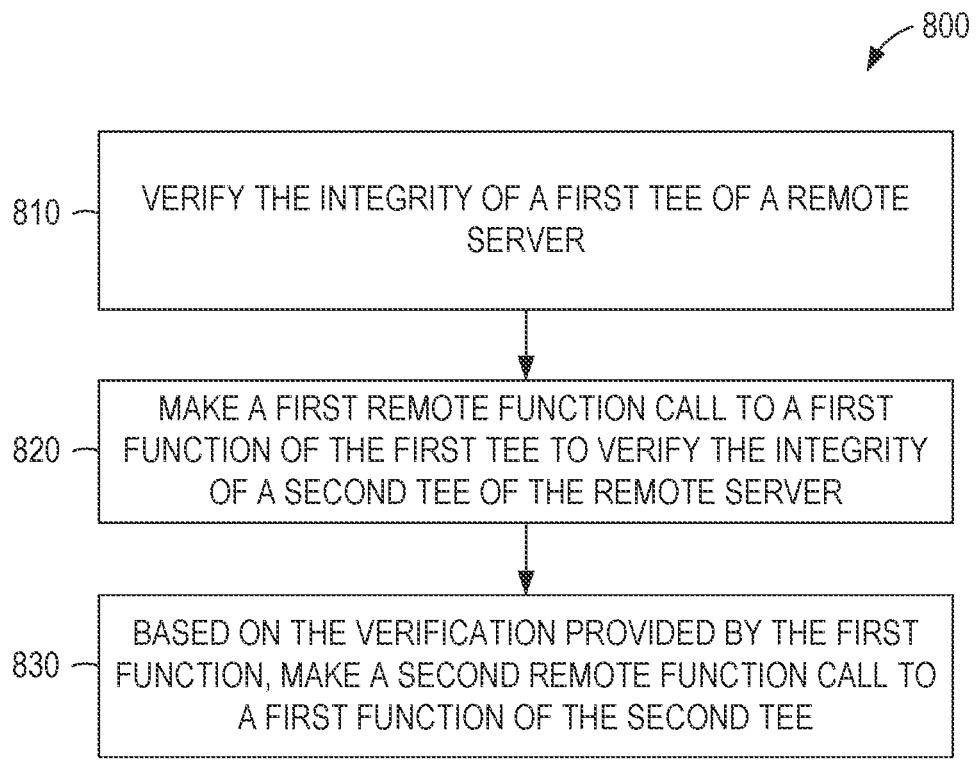
FIG. 8 is a flowchart illustrating operations of a method suitable for execution by a client in making use of scalable attestation for TEEs, according to some example embodiments.

FIG. 8 is a flowchart illustrating operations of a method 800 suitable for execution by a client in making use of scalable attestation for TEEs, according to some example embodiments. The method 800 includes operations 810, 820, and 830. By way of example and not limitation, the method 800 may be performed by the client device 120A of FIG. 1, using the modules, databases, and structures shown in FIGS. 2-4.

In operation 810, a client device (e.g., the client device 120A) verifies the integrity of a first TEE of a remote server (e.g., the FaaS server 110A). For example, the client device 120A may request signed attestation data from the surrogate attestation client 630A. The surrogate attestation client 630A generates attestation data from within a TEE and the attestation data is signed by a hardware-protected key that can only be accessed from within a TEE. The client device 120A receives the signed attestation data, verifies the signature using the trusted domain module 240 of the client device 120A, and verifies the attestation data against a local copy of the attestation data generated before the code and data for the TEE was provided to the remote server.

The client device, in operation 820, makes a first remote function call to a first function of the first TEE to verify the integrity of a second TEE of the remote server. For example, the client device 120A may invoke the surrogate attestation client 630A to verify the integrity of the TEE containing the function 420A. The surrogate attestation client 630A performs a local attestation of the second TEE and sends a secure confirmation to the client device 120A that the TEE of the function 630A has been attested.

In some example embodiments, the first remote function call includes data from the client device 120A for the second TEE being attested. In these example embodiments, the surrogate attestation client 630A compares the attestation data received from the client device 120A with the attestation data received locally for the second TEE. If the two sets of attestation data match, a verification response is provided to the client device 120A. Otherwise, the surrogate attestation client 630A indicates that the second TEE could not be verified.

In other example embodiments, the TEE for the surrogate attestation client 430A includes attestation data for the second TEE when the surrogate attestation client 630A is deployed. In these example embodiments, the surrogate attestation client 630A compares the stored attestation data with the attestation data received locally for the second TEE to determine whether to send a verification response or an indication that the second TEE could not be verified.

In operation 830, based on the verification provided by the first function, the client device makes a second remote function call to a first function of the second TEE. For example, if the surrogate attestation client 630A verified the second TEE, the client device 120A may invoke the verified function 620A. Invocation of the verified function 620A may be direct, as with invocation of the surrogate attestation client 630A, or indirect, making use of the gateway 610.

Thus, by use of the method 800, the client device 120A is enabled to verify any number of functions in any number of TEEs on the FaaS server 110A while only directly invoking the surrogate attestation client 630A, reducing the complexity of the verification process on both client and server and reducing network traffic and related overhead.

Figure 9:
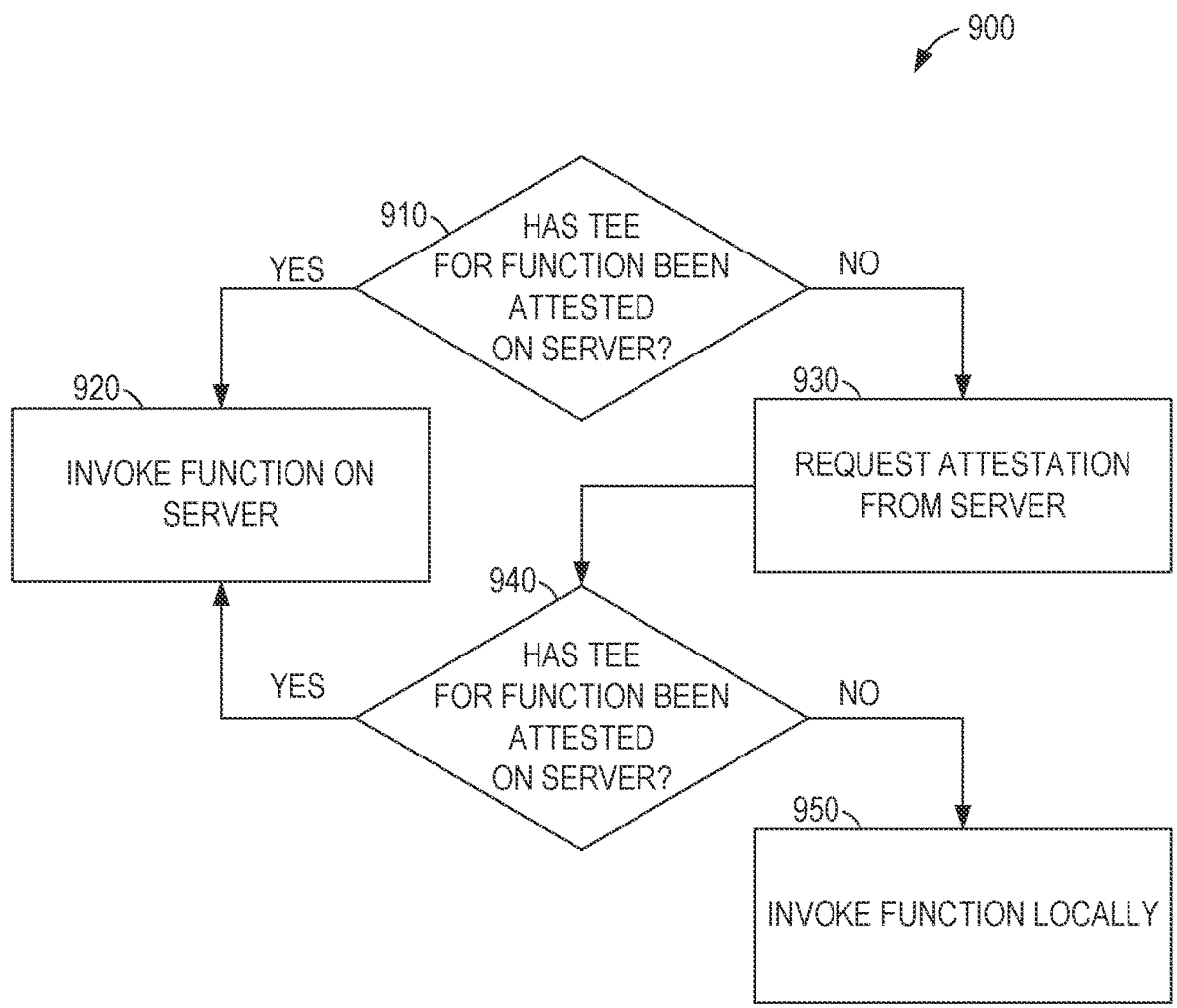
FIG. 9 is a flowchart illustrating operations of a method suitable for execution by a client in making use of scalable attestation for TEEs, according to some example embodiments.

FIG. 9 is a flowchart illustrating operations of a method 900 suitable for execution by a client in making use of scalable attestation for TEEs, according to some example embodiments. The method 900 includes operations 910, 920, 930, 940, and 950. By way of example and not limitation, the method 900 may be performed by the client device 120A of FIG. 1, using the modules, databases, and structures shown in FIGS. 2-4.

In operation 910, a client device (e.g., the client device 120A) determines whether a TEE for a function has been attested on a remote server (e.g., the FaaS server 110A). For example, the remote function table 540 of FIG. 5 may be queried to determine if an entry for the function exists and indicates that the function has been attested.

If the TEE has been attested, the client device invokes the function on the remote server (operation 920). With reference to the row 560A of the remote function table 540, the client device confirms in operation 910 that the DSP function is attested and, in operation 920, invokes the DSP function on the server 10.0.0.1.

However, if the TEE has not been attested, the client device requests, in operation 930, attestation from the remote server. As discussed with respect to the method 800 and the block diagram 600, this may be performed by making a remote function call to a different function in a different TEE on the remote server.

In operation 940, the result of the requested attestation is checked by the client device. If the attestation was successful, the local data indicating whether the function was attested is updated (e.g., by adding a row to the attestation table 510 or updating an existing row in the remote function table 540) and the remote function is invoked (operation 920).

If the attestation was not successful, a local version of the function is invoked (operation 950). In some example embodiments, the computing power of the remote server is greater than the computing power of the client device, and thus using the remote server is preferred when secure functionality is available. However, by being able to invoke the function locally, the application making use of the function is able to proceed even if the remote server is unable to provide the function.

Thus, by use of the method 900, the client device 120A is enabled to verify any number of functions in any number of TEEs on the FaaS server 110A while only directly invoking the surrogate attestation client 630A, reducing the complexity of the verification process on both client and server and reducing network traffic and related overhead. Additionally, functions may be invoked locally when they are unavailable or unsecured remotely, allowing for greater reliability.

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system to provide remote attestation of a trusted execution environment (TEE), the system comprising: at least one processor; a network interface operatively coupled to the processor; and a memory coupled to the at least one processor to store instructions that, when executed by the processor, cause the at least one processor to perform operations comprising: creating a first TEE for a first function; creating a second TEE for a second function; providing a gateway for remote access to the first function; receiving, from a client device and via the network interface, a request to verify integrity of the second TEE; and in response to the request: executing the first function to generate attestation data for the second TEE; and providing the attestation data to the client device via the network interface.

In Example 2, the subject matter of Example 1 includes, wherein the generating of the attestation data for the second TEE comprises: generating, from within the second TEE, a signed structure that comprises an identity of the second TEE, an attribute of the second TEE, and a message authentication code (MAC), the structure being signed using an ephemeral private key; and verifying the signed structure using the first function of the first TEE.

In Example 3, the subject matter of Examples 1-2 includes, wherein the operations further comprise: receiving a function call at the gateway from the client device and via the network interface, the function call associated with the second function; and in response to the function call: executing the second function to generate a return value; and providing the return value to the client device via the network interface.

In Example 4, the subject matter of Example 3 includes, wherein the operations further comprise: in response to the function call, requesting, by the second function, access to data of the first TEE.

In Example 5, the subject matter of Example 4 includes, wherein the operations further comprise: determining, by the first function, that the second function has been verified; and in response to the request by the second function for access to the data of the first TEE, based on the determination that the second function has been verified, providing the requested access to the data.

In Example 6, the subject matter of Example 5 includes, wherein the providing of the requested access to the data comprises: encrypting the data using an ephemeral key; and providing access to the ephemeral key to the second function.

In Example 7, the subject matter of Examples 1-6 includes, wherein the operations further comprise: before receiving the request to verify the integrity of the second TEE, receive a second request to verify the integrity of the first TEE.

In Example 8, the subject matter of Examples 1-7 includes, wherein the gateway is not verified by the client device.

In Example 9, the subject matter of Examples 1-8 includes, wherein: the gateway provides remote access to a third function of a third TEE; and the first function is unable to verify integrity of the third TEE.

In Example 10, the subject matter of Example 9 includes, wherein the operations further comprise: creating a fourth TEE for a fourth function; and receiving a second function call to the fourth function from a second client device and via the network interface, the second function call to verify the integrity of the third TEE.

Example 11 is a method of providing remote attestation of a trusted execution environment (TEE), the method comprising: creating, by a processor, a first trusted execution environment (TEE) for a first function; creating, by the processor, a second TEE for a second function; providing, by the processor, a gateway for remote access to the first function; receiving, from a client device and via a network interface, a request to verify integrity of the second TEE; in response to the request: executing, by the processor, the first function to generate attestation data for the second TEE; and providing the attestation data to the client device via the network interface.

In Example 12, the subject matter of Example 11 includes, wherein the generating of the attestation data for the second function comprises: generating, from within the second TEE, a signed structure that comprises an identity of the second TEE, an attribute of the second TEE, and a message authentication code (MAC), the structure being signed using an ephemeral private key; and verifying, by the processor, the signed structure using the first function of the first TEE.

In Example 13, the subject matter of Examples 11-12 includes, receiving a function call at the gateway from the client device and via the network interface, the function call associated with the second function; and in response to the function call: executing, by the processor, the second function to generate a return value; and providing the return value to the client device via the network interface.

In Example 14, the subject matter of Example 13 includes, in response to the function call, requesting, by the second function, access to data of the first TEE.

In Example 15, the subject matter of Example 14 includes, determining, by the first function, that the second function has been verified; and in response to the request by the second function for access to the data of the first TEE, based on the determination that the second function has been verified, providing the requested access to the data.

In Example 16, the subject matter of Example 15 includes, wherein the providing of the requested access to the data comprises: encrypting the data using an ephemeral key; and providing access to the ephemeral key to the second function.

In Example 17, the subject matter of Examples 11-16 includes, before receiving the request to verify the integrity of the second TEE, receiving a second request to verify the integrity of the first TEE.

In Example 18, the subject matter of Examples 11-17 includes, wherein the gateway is not verified by the client device.

In Example 19, the subject matter of Examples 11-18 includes, wherein: the gateway provides remote access to a third function of a third TEE; and the first function is unable to verify integrity of the third TEE.

In Example 20, the subject matter of Example 19 includes, creating, by the processor, a fourth TEE for a fourth function; and receiving a second function call to the fourth function from a second client device and via the network interface, the second function call to verify the integrity of the third TEE.

Example 21 is a non-transitory computer readable medium having instructions for causing at least one processor to provide remote attestation of a trusted execution environment (TEE) by performing operations comprising: creating a first trusted execution environment (TEE) for a first function; creating a second TEE for a second function; providing a gateway for remote access to the first function; receiving, from a client device and via a network interface, a request to verify integrity of the second TEE; in response to the request: executing the first function to generate attestation data for the second TEE; and providing the attestation data to the client device via the network interface.

In Example 22, the subject matter of Example 21 includes, wherein the generating of the attestation data for the second function comprises: generating, from within the second TEE, a signed structure that comprises an identity of the second TEE, an attribute of the second TEE, and a message authentication code (MAC), the structure being signed using an ephemeral private key; and verifying the signed structure using the first function of the first TEE.

In Example 23, the subject matter of Examples 21-22 includes, wherein the operations further comprise: receiving a function call at the gateway from the client device and via the network interface, the function call associated with the second function; and in response to the function call: executing the second function to generate a return value; and providing the return value to the client device via the network interface.

In Example 24, the subject matter of Example 23 includes, wherein the operations further comprise: in response to the function call, requesting, by the second function, access to data of the first TEE.

In Example 25, the subject matter of Example 24 includes, wherein the operations further comprise: determining, by the first function, that the second function has been verified; and in response to the request by the first function for access to the data of the first TEE, based on the determination that the second function has been verified, providing the requested access to the data.

In Example 26, the subject matter of Example 25 includes, wherein the providing of the requested access to the data comprises: encrypting the data using an ephemeral key; and providing access to the ephemeral key to the second function.

In Example 27, the subject matter of Examples 21-26 includes, wherein the operations further comprise: before receiving the request to verify the integrity of the second function, receiving a second request to verify the integrity of the first function.

In Example 28, the subject matter of Examples 21-27 includes, wherein the gateway is not verified by the client device.

In Example 29, the subject matter of Examples 21-28 includes, wherein: the gateway provides remote access to a third function of a third TEE; and the first function is unable to verify the integrity of the third TEE.

In Example 30, the subject matter of Example 29 includes, wherein the operations further comprise: creating, by the processor, a fourth TEE for a fourth function; and receiving a second function call to the fourth function from a second client device and via the network interface, the second function call to verify the integrity of the third TEE.

Example 31 is a system to provide remote attestation of a trusted execution environment (TEE), the system comprising: means for storage; network interface means; and processing means to: create a first TEE for a first function; create a second TEE for a second function; provide a gateway for remote access to the first function; receive, from a client device and via the network interface means, a request to verify integrity of the second TEE; in response to the request: execute the first function to generate attestation data for the second TEE; and provide the attestation data to the client device via the network interface means.

In Example 32, the subject matter of Example 31 includes, wherein to generate the attestation data for the second TEE, the processing means is to: generate, from within the second TEE, a signed structure that comprises an identity of the second TEE, an attribute of the second TEE, and a message authentication code (MAC), the structure being signed using an ephemeral private key; and verify the signed structure using the first function of the first TEE.

In Example 33, the subject matter of Examples 31-32 includes, wherein the processing means is further to: receive a function call at the gateway from the client device and via the network interface means, the function call associated with the second function; and in response to the function call: execute the second function to generate a return value; and provide the return value to the client device via the network interface means.

In Example 34, the subject matter of Example 33 includes, wherein the processing means is further to: in response to the function call, request, by the second function, access to data of the first TEE.

In Example 35, the subject matter of Example 34 includes, wherein the processing means is further to: determine, by the first function, that the second function has been verified; and in response to the request by the second function for access to the data of the first TEE, based on the determination that the second function has been verified, provide the requested access to the data.

In Example 36, the subject matter of Example 35 includes, wherein to provide the requested access to the data, the processing means is to: encrypt the data using an ephemeral key; and provide access to the ephemeral key to the second function.

In Example 37, the subject matter of Examples 31-36 includes, wherein the processing means is further to: before receiving the request to verify the integrity of the second TEE, receive a second request to verify integrity of the first TEE.

In Example 38, the subject matter of Examples 31-37 includes, wherein the gateway is not verified by the client device.

In Example 39, the subject matter of Examples 31-38 includes, wherein: the gateway provides remote access to a third function of a third TEE; and the first function is unable to verify integrity of the third TEE.

In Example 40, the subject matter of Example 39 includes, wherein the processing means is further to: create a fourth TEE for a fourth function; and receive a second function call to the fourth function from a second client device and via the network interface means, the second function call to verify the integrity of the third TEE.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Figure 10:
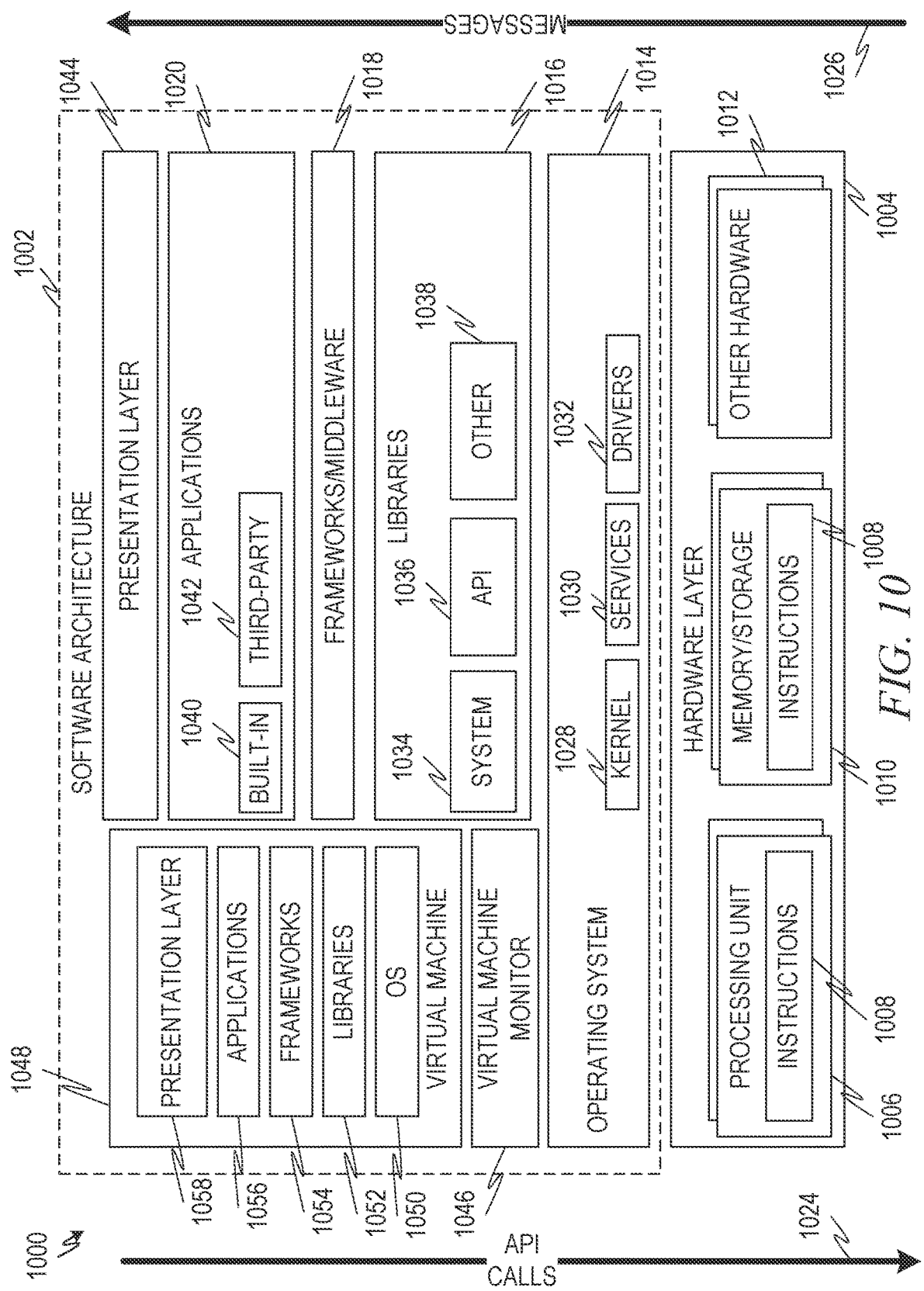
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NEC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middle ware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
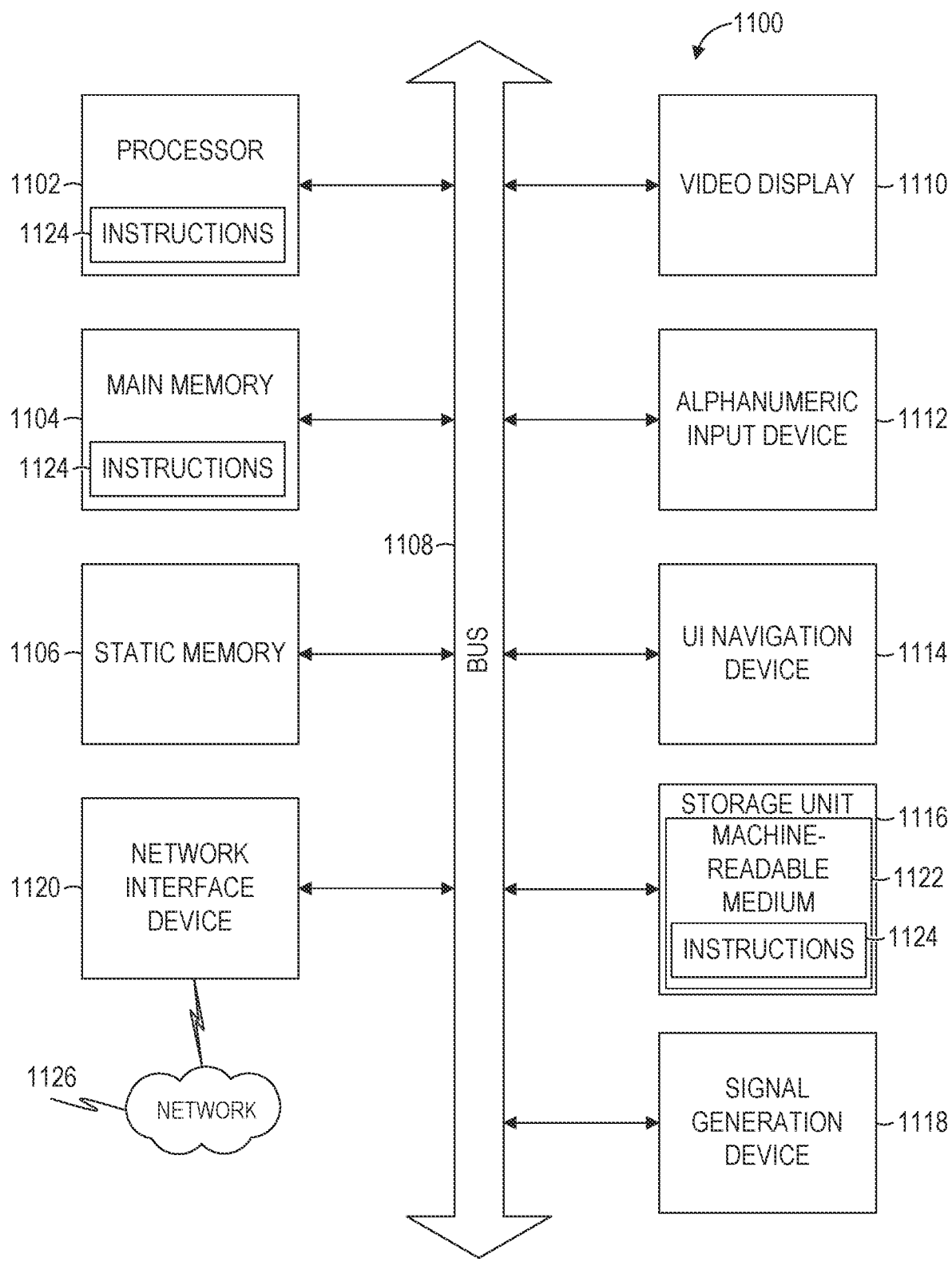
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media. (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein, Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
   at least one processor;
   a network interface operatively coupled to the processor; and
   a memory coupled to the processor to store instructions that, when executed by the processor, cause the at least one processor to perform operations comprising:
   creating a first trusted execution environment (TEE) for a first function, the first function to produce first processing results for a tenant;
   creating a second TEE for a second function, the second function to produce second processing results for the tenant;
   configuring a gateway to provide remote access from a client device to the first function;
   receiving, from the client device and via the network interface, a request to verify integrity of the second TEE; and
   in response to the request:
   generating attestation data for the second TEE;
   evaluating the attestation data with a surrogate attester to perform validation the second TEE; and
   in response to the validation of the second TEE, configuring the gateway to provide remote access from the client device to the second function via the network interface.

2. The system of claim 1, wherein the generating of the attestation data for the second TEE comprises:
   generating, from within the second TEE, a signed structure that comprises an identity of the second TEE, an attribute of the second TEE, and a message authentication code (MAC), the structure being signed using an ephemeral private key; and
   verifying the signed structure using the surrogate attester.

3. The system of claim 1, wherein the operations further comprise:
   receiving a function call at the gateway from the client device and via the network interface, the function call associated with the second function; and
   in response to the function call:
   executing the second function to generate a return value; and
   providing the return value to the client device via the network interface.

4. The system of claim 3, wherein the operations further comprise:
   in response to the function call, requesting, by the second function, access to data of the first TEE, wherein the access to the data of the first TEE is limited based on validation of the second TEE by the surrogate attester.

5. The system of claim 4, wherein the operations further comprise:
   determining, by the first function, that the second function has been verified by the surrogate attester; and
   in response to the request by the second function for access to the data of the first TEE, based on the determination that the second TEE has been verified by the surrogate attester, providing the requested access to the data.

6. The system of claim 5, wherein the providing of the requested access to the data comprises:
   encrypting the data using an ephemeral key; and
   providing access to the ephemeral key to the second function.

7. The system of claim 1, wherein the operations further comprise:
   before receiving the request to verify the integrity of the second TEE, receive a second request to verify the integrity of the first TEE.

8. The system of claim 1, wherein the gateway is not verified by the client device.

9. The system of claim 1, wherein:
   the gateway provides remote access to a third function of a third TEE, the third function to produce third processing results for the tenant; and
   the first function is unable to verify integrity of the third TEE.

10. The system of claim 9, wherein the operations further comprise:
    creating a fourth TEE for a fourth function, the fourth function to produce fourth processing results for another tenant; and
    receiving a second function call to the fourth function from a second client device and via the network interface, the second function call to cause another surrogate attester to verify the integrity of the third TEE.

11. A method comprising:
creating, by a processor, a first trusted execution environment (TEE) for a first function, the first function to produce first processing results for a tenant;
creating, by the processor, a second TEE for a second function, the second function to produce second processing results for the tenant;
configuring, by the processor, a gateway to provide remote access from a client device to the first function;
receiving, from a client device and via a network interface, a request to verify integrity of the second TEE;
in response to the request:
generating attestation data for the second TEE;
evaluating the attestation data with a surrogate attester to perform validation of the second TEE; and
in response to the validation of the second TEE, configuring the gateway to provide remote access from the client device to the second function via the network interface.

12. The method of claim 11, wherein the generating of the attestation data for the second function comprises:
generating, from within the second TEE, a signed structure that comprises an identity of the second TEE, an attribute of the second TEE, and a message authentication code (MAC), the structure being signed using an ephemeral private key; and
verifying, by the processor, the signed structure using the surrogate attester.

13. The method of claim 11, further comprising:
receiving a function call at the gateway from the client device and via the network interface, the function call associated with the second function; and
in response to the function call:
executing, by the processor, the second function to generate a return value; and
providing the return value to the client device via the network interface.

14. The method of claim 13, further comprising:
in response to the function call, requesting, by the second function, access to data of the first TEE.

15. The method of claim 14, further comprising:
determining, by the first function, that the second function has been verified; and
in response to the request by the second function for access to the data of the first TEE, based on the determination that the second function has been verified, providing the requested access to the data, wherein the access to the data of the first TEE is limited based on validation of the second TEE by the surrogate attester.

16. A non-transitory computer readable medium that stores instructions that, when executed by at least one processor, cause the at least one processor to perform operations comprising:
creating a first trusted execution environment (TEE) for a first function, the first function to produce first processing results for a tenant;
creating a second TEE for a second function, the second function to produce second processing results for the tenant;
configuring a gateway to provide remote access from a client device to the first function;
receiving, from the client device and via a network interface, a request to verify integrity of the second TEE; and
in response to the request:
generating attestation data for the second TEE;
evaluating the attestation data with a surrogate attester to perform validation of the second TEE; and
in response to the validation of the second TEE, configuring the gateway to provide remote access from the client device to the second function via the network interface.

17. The non-transitory computer readable medium of claim 16, wherein the generating of the attestation data for the second function comprises:
generating, from within the second TEE, a signed structure that comprises an identity of the second TEE, an attribute of the second TEE, and a message authentication code (MAC), the structure being signed using an ephemeral private key; and
verifying the signed structure using the surrogate attester.

18. The non-transitory computer readable medium of claim 16, wherein the operations further comprise:
receiving a function call at the gateway from the client device and via the network interface, the function call associated with the second function; and
in response to the function call:
executing the second function to generate a return value; and
providing the return value to the client device via the network interface.

19. The non-transitory computer readable medium of claim 18, wherein the operations further comprise:
in response to the function call, requesting, by the second function, access to data of the first TEE.

20. The non-transitory computer readable medium of claim 19, wherein the operations further comprise:
determining, by the first function, that the second function has been verified; and
in response to the request by the first function for access to the data of the first TEE, based on the determination that the second function has been verified, providing the requested access to the data, wherein the access to the data of the first TEE is limited based on validation of the second TEE by the surrogate attester.

21. The non-transitory computer readable medium of claim 20, wherein the providing of the requested access to the data comprises:
encrypting the data using an ephemeral key; and
providing access to the ephemeral key to the second function.

22. The non-transitory computer readable medium of claim 16, wherein the operations further comprise:
before receiving the request to verify the integrity of the second TEE, receiving a second request to verify the integrity of the first TEE.

23. The non-transitory computer readable medium of claim 16, wherein the gateway is not verified by the client device.

24. The non-transitory computer readable medium of claim 16, wherein:
 the gateway provides remote access to a third function of a third TEE, the third function to produce third processing results for the tenant; and
 the first function is unable to verify the integrity of the third TEE.

25. The non-transitory computer readable medium of claim 24, wherein the operations further comprise:
 creating, by the at least one processor, a fourth TEE for a fourth function, the fourth function to produce fourth processing results for another tenant; and
 receiving a third function call to the fourth function, from a second client device and via the network interface, the third function call cause another surrogate attester to verify the integrity of the third TEE.

* * * * *